US009438889B2

(12) United States Patent
Atanassov et al.

(10) Patent No.: US 9,438,889 B2
(45) Date of Patent: Sep. 6, 2016

(54) SYSTEM AND METHOD FOR IMPROVING METHODS OF MANUFACTURING STEREOSCOPIC IMAGE SENSORS

(71) Applicants: Kalin Mitkov Atanassov, San Diego, CA (US); Sergiu R Goma, San Diego, CA (US); Vikas Ramachandra, San Diego, CA (US); Milivoje Aleksic, San Diego, CA (US)

(72) Inventors: Kalin Mitkov Atanassov, San Diego, CA (US); Sergiu R Goma, San Diego, CA (US); Vikas Ramachandra, San Diego, CA (US); Milivoje Aleksic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 807 days.

(21) Appl. No.: 13/622,318

(22) Filed: Sep. 18, 2012

(65) Prior Publication Data
US 2013/0070055 A1 Mar. 21, 2013

Related U.S. Application Data

(60) Provisional application No. 61/537,440, filed on Sep. 21, 2011.

(51) Int. Cl.
H04N 13/02 (2006.01)
(52) U.S. Cl.
CPC ................ *H04N 13/0246* (2013.01)
(58) Field of Classification Search
CPC .................................. H04N 13/0246
USPC .............................................. 348/46
See application file for complete search history.

(56) References Cited

U.S. PATENT DOCUMENTS

| 4,114,171 A | 9/1978 | Altman |
| 4,437,745 A | 3/1984 | Hajnal |
| 4,639,586 A | 1/1987 | Fender et al. |
| 4,740,780 A | 4/1988 | Brown et al. |
| 4,751,570 A | 6/1988 | Robinson |
| 5,012,273 A | 4/1991 | Nakamura et al. |
| 5,016,109 A | 5/1991 | Gaylord |
| 5,063,441 A | 11/1991 | Lipton et al. |

(Continued)

FOREIGN PATENT DOCUMENTS

| CN | 101201459 A | 6/2008 |
| CN | 101581828 A | 11/2009 |

(Continued)

OTHER PUBLICATIONS

International Search Report and Written Opinion—PCT/US2012/056068—ISA/EPO—Jan. 30, 2013.

(Continued)

Primary Examiner — Yulin Sun
(74) Attorney, Agent, or Firm — Knobbe Martens Olson & Bear, LLP

(57) ABSTRACT

Described herein are methods, systems and apparatus to improve imaging sensor production yields. In one method, a stereoscopic image sensor pair is provided from a manufacturing line. One or more images of a correction pattern are captured by the image sensor pair. Correction angles of the sensor pair are determined based on the images of the correction pattern. The correction angles of the sensor pair are represented graphically in a three dimensional space. Analysis of the graphical representation of the correction angles through statistical processing results in a set of production correction parameters that may be input into a manufacturing line to improve sensor pair yields.

20 Claims, 11 Drawing Sheets

(56) References Cited

U.S. PATENT DOCUMENTS

| | | |
|---|---|---|
| 5,142,357 A | 8/1992 | Lipton et al. |
| 5,194,959 A | 3/1993 | Kaneko et al. |
| 5,207,000 A | 5/1993 | Chang et al. |
| 5,231,461 A | 7/1993 | Silvergate et al. |
| 5,243,413 A | 9/1993 | Gitlin et al. |
| 5,313,542 A | 5/1994 | Castonguay |
| 5,475,617 A | 12/1995 | Castonguay |
| 5,539,483 A | 7/1996 | Nalwa |
| 5,606,627 A * | 2/1997 | Kuo ............................. 382/154 |
| 5,614,941 A | 3/1997 | Hines |
| 5,640,222 A | 6/1997 | Paul |
| 5,642,299 A | 6/1997 | Hardin et al. |
| 5,686,960 A | 11/1997 | Sussman et al. |
| 5,721,585 A | 2/1998 | Keast et al. |
| 5,734,507 A | 3/1998 | Harvey |
| 5,745,305 A | 4/1998 | Nalwa |
| 5,793,527 A | 8/1998 | Nalwa |
| 5,903,306 A | 5/1999 | Heckendorn et al. |
| 5,926,411 A | 7/1999 | Russell |
| 5,990,934 A | 11/1999 | Nalwa |
| 6,111,702 A | 8/2000 | Nalwa |
| 6,115,176 A | 9/2000 | Nalwa |
| 6,128,143 A | 10/2000 | Nalwa |
| 6,141,145 A | 10/2000 | Nalwa |
| 6,144,501 A | 11/2000 | Nalwa |
| 6,195,204 B1 | 2/2001 | Nalwa |
| 6,219,090 B1 | 4/2001 | Nalwa |
| 6,285,365 B1 | 9/2001 | Nalwa |
| 6,356,397 B1 | 3/2002 | Nalwa |
| 6,611,289 B1 | 8/2003 | Yu et al. |
| 6,628,897 B2 | 9/2003 | Suzuki |
| 6,650,774 B1 | 11/2003 | Szeliski |
| 6,700,711 B2 | 3/2004 | Nalwa |
| 6,701,081 B1 | 3/2004 | Dwyer et al. |
| 6,768,509 B1 * | 7/2004 | Bradski et al. .......... 348/207.99 |
| 6,775,437 B2 | 8/2004 | Kazarinov et al. |
| 6,798,406 B1 | 9/2004 | Jones et al. |
| 6,809,887 B1 | 10/2004 | Gao et al. |
| 6,850,279 B1 | 2/2005 | Scherling |
| 6,855,111 B2 | 2/2005 | Yokoi et al. |
| 6,861,633 B2 | 3/2005 | Osborn |
| 7,006,123 B2 | 2/2006 | Yoshikawa et al. |
| 7,039,292 B1 | 5/2006 | Breiholz |
| 7,084,904 B2 | 8/2006 | Liu et al. |
| 7,116,351 B2 | 10/2006 | Yoshikawa |
| 7,215,479 B1 | 5/2007 | Bakin |
| 7,253,394 B2 | 8/2007 | Kang |
| 7,271,803 B2 | 9/2007 | Ejiri et al. |
| 7,336,299 B2 | 2/2008 | Kostrzewski et al. |
| 7,612,953 B2 | 11/2009 | Nagai et al. |
| 7,710,463 B2 | 5/2010 | Foote |
| 7,805,071 B2 | 9/2010 | Mitani |
| 7,817,354 B2 | 10/2010 | Wilson |
| 7,893,957 B2 | 2/2011 | Peters et al. |
| 7,961,398 B2 | 6/2011 | Tocci |
| 8,004,557 B2 | 8/2011 | Pan |
| 8,098,276 B2 | 1/2012 | Chang et al. |
| 8,115,813 B2 | 2/2012 | Tang |
| 8,139,125 B2 | 3/2012 | Scherling |
| 8,228,417 B1 | 7/2012 | Georgiev et al. |
| 8,267,601 B2 | 9/2012 | Campbell et al. |
| 8,284,263 B2 | 10/2012 | Oohara et al. |
| 8,294,073 B1 | 10/2012 | Vance et al. |
| 8,356,035 B1 | 1/2013 | Baluja et al. |
| 8,400,555 B1 | 3/2013 | Georgiev et al. |
| 8,482,813 B2 | 7/2013 | Kawano et al. |
| 8,791,984 B2 | 7/2014 | Jones et al. |
| 8,988,564 B2 | 3/2015 | Webster et al. |
| 9,316,810 B2 | 4/2016 | Mercado |
| 2001/0028482 A1 | 10/2001 | Nishioka |
| 2002/0070365 A1 | 6/2002 | Karellas |
| 2002/0136150 A1 | 9/2002 | Mihara et al. |
| 2003/0024987 A1 | 2/2003 | Zhu |
| 2003/0038814 A1 | 2/2003 | Blume |
| 2003/0214575 A1 | 11/2003 | Yoshikawa |
| 2004/0021767 A1 | 2/2004 | Endo et al. |
| 2004/0066449 A1 | 4/2004 | Givon |
| 2004/0105025 A1 | 6/2004 | Scherling |
| 2004/0183907 A1 | 9/2004 | Hovanky et al. |
| 2004/0246333 A1 | 12/2004 | Steuart |
| 2004/0263611 A1 | 12/2004 | Cutler |
| 2005/0053274 A1 | 3/2005 | Mayer et al. |
| 2005/0057659 A1 | 3/2005 | Hasegawa |
| 2005/0081629 A1 * | 4/2005 | Hoshal ...................... 73/504.03 |
| 2005/0111106 A1 | 5/2005 | Matsumoto et al. |
| 2005/0185711 A1 | 8/2005 | Pfister et al. |
| 2005/0218297 A1 | 10/2005 | Suda et al. |
| 2006/0023074 A1 | 2/2006 | Cutler |
| 2006/0023106 A1 | 2/2006 | Yee et al. |
| 2006/0023278 A1 | 2/2006 | Nishioka |
| 2006/0140446 A1 | 6/2006 | Luo et al. |
| 2006/0193509 A1 | 8/2006 | Criminisi et al. |
| 2006/0215054 A1 | 9/2006 | Liang et al. |
| 2006/0215903 A1 | 9/2006 | Nishiyama |
| 2006/0238441 A1 | 10/2006 | Benjamin et al. |
| 2007/0024739 A1 | 2/2007 | Konno |
| 2007/0058961 A1 | 3/2007 | Kobayashi et al. |
| 2007/0064142 A1 | 3/2007 | Misawa et al. |
| 2007/0085903 A1 | 4/2007 | Zhang |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0088702 A1 | 4/2008 | Linsenmaier et al. |
| 2008/0117289 A1 | 5/2008 | Schowengerdt et al. |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0268983 A1 | 10/2009 | Stone et al. |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 * | 9/2010 | Fujieda et al. ................ 382/154 |
| 2010/0259655 A1 | 10/2010 | Takayama |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1 | 11/2010 | Sim et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0304764 A1 | 12/2011 | Shigemitsu et al. |

(56) References Cited

U.S. PATENT DOCUMENTS

| | | |
|---|---|---|
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0141802 A1 | 6/2013 | Yang |
| 2013/0222556 A1 | 8/2013 | Shimada |
| 2013/0229529 A1 | 9/2013 | Lablans |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0335598 A1 | 12/2013 | Gustavsson et al. |
| 2013/0335600 A1 | 12/2013 | Gustavsson et al. |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1 | 4/2014 | Georgiev et al. |
| 2014/0139623 A1 | 5/2014 | McCain et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2015/0049172 A1 | 2/2015 | Ramachandra et al. |
| 2015/0070562 A1 | 3/2015 | Nayar et al. |
| 2015/0125092 A1 | 5/2015 | Zhuo et al. |
| 2015/0177524 A1 | 6/2015 | Webster et al. |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0370040 A1 | 12/2015 | Georgiev |
| 2015/0371387 A1 | 12/2015 | Atanassov et al. |
| 2015/0373252 A1 | 12/2015 | Georgiev |
| 2015/0373262 A1 | 12/2015 | Georgiev |
| 2015/0373263 A1 | 12/2015 | Georgiev |
| 2015/0373268 A1 | 12/2015 | Osborne |
| 2015/0373269 A1 | 12/2015 | Osborne |
| 2015/0373279 A1 | 12/2015 | Osborne |
| 2016/0085059 A1 | 3/2016 | Mercado |
| 2016/0127646 A1 | 5/2016 | Osborne |

FOREIGN PATENT DOCUMENTS

| | | |
|---|---|---|
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | H08009424 A | 1/1996 |
| JP | H08194274 A | 1/1996 |
| JP | H0847001 A | 2/1996 |
| JP | H088125835 A | 5/1996 |
| JP | H08242453 A | 9/1996 |
| JP | 2001194114 A | 7/2001 |
| JP | 2003304561 A | 10/2003 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | 2010041381 A | 2/2010 |
| JP | 2010067014 A | 3/2010 |
| JP | 2010128820 A | 6/2010 |
| JP | 2010524279 A | 7/2010 |
| WO | WO-9321560 A1 | 10/1993 |
| WO | WO-9847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Arican, et al., "Intermediate View Generation for Perceived Depth Adjustment of Sterio Video", Mitsubishi Electric Research Laboratories, http://www.merl.com, TR2009-052, Sep. 2009; 12 pages.

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, In Depth Look," IEEE Potentials, Feb./Mar. 2004, vol. 23, Issue 1, pp. 38-42.

Sun W.S., et al., "Single-Lens Camera Based on a Pyramid Prism Array to Capture Four Images," Optical Review, 2013, vol. 20 (2), pp. 145-152.

Krotkov E., et al., "Active vision for reliable ranging: Cooperating focus, stereo, and vergence", International Journal of Computer Vision. vol. 11, No. 2, Oct. 1, 1993, pp. 187-203, XP055149875, ISSN: 0920-5691. DOI: 10.1007/BF01469228.

RICOH Imagine Change: "New RICOH THETA Model, Capturing 360-degree Images in One Shot, is on Sale Soon—Spherical Video Function, API and SDK (Beta Version)", News Release, 2014, 3 pages.

Han Y., et al., "Removing Illumination from Image Pair for Stereo Matching", Audio, Language and Image Processing (ICALIP), 2012 International Conference on, IEEE, Jul. 2012, XP032278010, pp. 508-512.

Hao M., et al., "Object Location Technique for Binocular Stereo Vision Based on Scale Invariant Feature Transform Feature Points", SIFT, Journal of Harbin Engineering University, Jun. 2009, vol. 30, No. 6, pp. 649-653.

Kawanishi T., et al., "Generation of High-Resolution Stereo Panoramic Images by Omnidirectional Imaging Sensor Using Hexagonal Pyramidal Mirrors", Patiern Recognition, 1998, Proceedings, Fourteenth International Conference on Brisbane, QLD., Australia Aug. 16-20, 1998, Los Alamitos, CA, USA,IEEE Comput. Soc, US Jan. 1998, pp. 485-489, vol. 1, XP031098377, ISBN:978-08186-8512-5.

Shuchun Y., et al., "Preprocessing for stereo vision based on LOG filter", Proceedings of 2011 6th International Forum on Strategic Technology, Aug. 2011, XP055211077, pp. 1074-1077.

Tan K-H., et al., "Multiview Panoramic Cameras Using a Pyramid", Omnidirectional Vision, 2002, Proceedings Third Workshop on Jun. 2, 2002, Piscataway NJ, USA, IEEE, Jan. 1, 2002, pp. 87-93, XP010611080, ISBN:978-0-7695-1629-5.

* cited by examiner

SYSTEM AND METHOD FOR IMPROVING METHODS OF MANUFACTURING STEREOSCOPIC IMAGE SENSORS

CROSS-REFERENCE TO RELATED APPLICATIONS

The application claims the priority benefit of U.S. Provisional Application No. 61/537,440, entitled "METHODS OF MANUFACTURING OF IMAGING SENSORS USING THREE DIMENSIONAL STATISTICAL PROCESSING TO IMPROVE SENSOR YIELD," filed Sep. 21, 2011, the entirety of which is incorporated herein by reference.

BACKGROUND

1. Technical Field of the Invention

The present embodiments relate to imaging devices, and in particular, to systems, methods, and apparatus for improving the manufacturing of stereoscopic image sensors.

2. Description of the Related Art

Digital imaging capabilities are currently being integrated into a wide range of devices, including digital cameras and mobile phones. Moreover, the ability to capture stereoscopic "3D" images with these devices has become technically possible. Device manufacturers have responded by introducing devices integrating digital image processing to support this capability, utilizing single or multiple digital imaging sensors. A wide range of electronic devices, including mobile wireless communication devices, personal digital assistants (PDAs), personal music systems, digital cameras, digital recording devices, video conferencing systems, and the like, make use of stereoscopic imaging capabilities to provide a variety of capabilities and features to their users. These include stereoscopic (3D) imaging applications such as 3D photos and videos or movies.

To make 3D playback comfortable for viewers, it is desirable to provide digital systems wherein the imaging sensors are perfectly aligned. This allows the individual images captured by each imaging sensor to be more perfectly aligned to provide a stereoscopic image. However, this perfect alignment is seldom achievable due to mechanical imperfections and errors in the physical placement of the imaging sensors due to manufacturing inconsistencies on a manufacturing line. These sensor alignment imperfections, when present, can lead to capture of unaligned images which may result in visual discomfort to the viewer unless otherwise corrected. In some cases, digital image alignment software may be used to correct for minor variations in image sensor positions. However, these digital corrections cannot correct for image sensors that are positioned outside of predetermined tolerances. Furthermore, imperfections in the sensor production lines may cause significant sensor yield drop if the imperfections result in improper mounting of image sensors that result in captured images that are outside of what can be corrected for digitally.

SUMMARY OF THE INVENTION

Some of the embodiments may comprise a method for improving imaging sensor yields for a pair of image sensors configured to capture a stereoscopic image, comprising providing a stereoscopic image sensor pair taken from a manufacturing line and capturing one or more images of a correction pattern with the sensor pair. The method may further comprise determining correction angles of the sensor pair based on the one or more images of the correction pattern and representing the correction angles of the sensor pair in a three dimensional space. The method may further comprise analyzing the three dimensional space of correction angles to determine a set of production correction parameters and imputing the production correction parameters to the manufacturing line to improve sensor pair yields. In some embodiments of the method, determining correction angles of the sensor pair comprises measuring a roll correction angle, measuring a yaw correction angle, and measuring a pitch correction angle of the image sensors in the sensor pair. In some embodiments the correction pattern may be a checkerboard composed of alternating light and dark squares. In some embodiments, the correction pattern may further comprise other colorations such that the colorations provide an orientation point for the image sensors in the sensor pair. In some embodiments, capturing one or more images of a correction pattern comprises capturing a first image of a correction pattern with a first imaging sensor and capturing a second image of a correction pattern with a second imaging sensor. In some embodiments, determining correction angles of the sensor pair further comprises detecting a coordinate system origin for each of the first and second images; detecting a set of key point coordinates within a boundary around the origin for each of the first and second images; determining a set of real world coordinates from the set of key point coordinates for each of the first and second images; and comparing the set of real world coordinates with the set of key point coordinates to determine correction angles for each sensor pair. In some embodiments, representing the correction angles in a three dimensional space comprises graphing a sensor pair correction requirement in a three dimensional space in which a first axis corresponds to a roll correction, a second axis corresponds to a yaw correction and a third axis corresponds to a pitch correction. In some embodiments, analyzing the three dimensional space of correction angles further comprises determining the mean and variance for the roll, pitch and yaw correction angles and determining the set of production correction parameters that satisfies one or both of a minimized variance of the correction angles or a mean of the correction angles of zero. In some embodiments, analyzing the three dimensional space of correction angles further comprises determining a set of possible combinations of two of the roll, pitch or yaw correction angles while holding fixed a mean of a third correction angle and determining the set of production correction parameters from the set of possible combinations. In some embodiments, analyzing the three dimensional space of correction angles further comprises determining a maximum correction angle for each of roll, pitch, and yaw and minimizing each correction angle sequentially.

Other embodiments may comprise a system to improve imaging sensor yields for a pair of image sensors configured to capture a stereoscopic image. The system may comprise a correction pattern comprised of two sheets of alternating light and dark squares joined at a ninety degree angle, a support for holding a stereoscopic image sensor pair in front of the correction pattern, an electronic processor coupled to each sensor of the image sensor pair and a control module configured to capture one or more images of the correction pattern with a sensor pair, determine correction angles of the sensor pair based on the one or more images of the correction pattern, represent the correction angles of the sensor pair in a three dimensional space, analyze the three dimensional space of correction angles to determine a set of production correction parameters, and input the production correction parameters to the manufacturing line to improve sensor pair yields.

Another innovative aspect disclosed is an apparatus for improving imaging sensor yields for a pair of image sensors configured to capture a stereoscopic image. The apparatus includes a means for providing a first image and a second image of a stereoscopic image pair, means for capturing one or more images of a correction pattern with the sensor pair, means for determining correction angles of the sensor pair based on the one or more images of the correction pattern, means for representing the correction angles of the sensor pair in a three dimensional space, means for analyzing the three dimensional space of correction angles to determine a set of production correction parameters, and means for imputing the production correction parameters to the manufacturing line to improve sensor pair yields.

Other embodiments may include a non-transitory computer readable medium containing processor executable instructions that are operative to cause a processor to perform a method of improving imaging sensor yields for a pair of image sensors configured to capture a stereoscopic image, the method including providing a stereoscopic image sensor pair taken from a manufacturing line, capturing one or more images of a correction pattern with the sensor pair, determining correction angles of the sensor pair based on the one or more images of the correction pattern, representing the correction angles of the sensor pair in a three dimensional space, analyzing the three dimensional space of correction angles to determine a set of production correction parameters, and inputting the production correction parameters to the manufacturing line to improve sensor pair yields.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
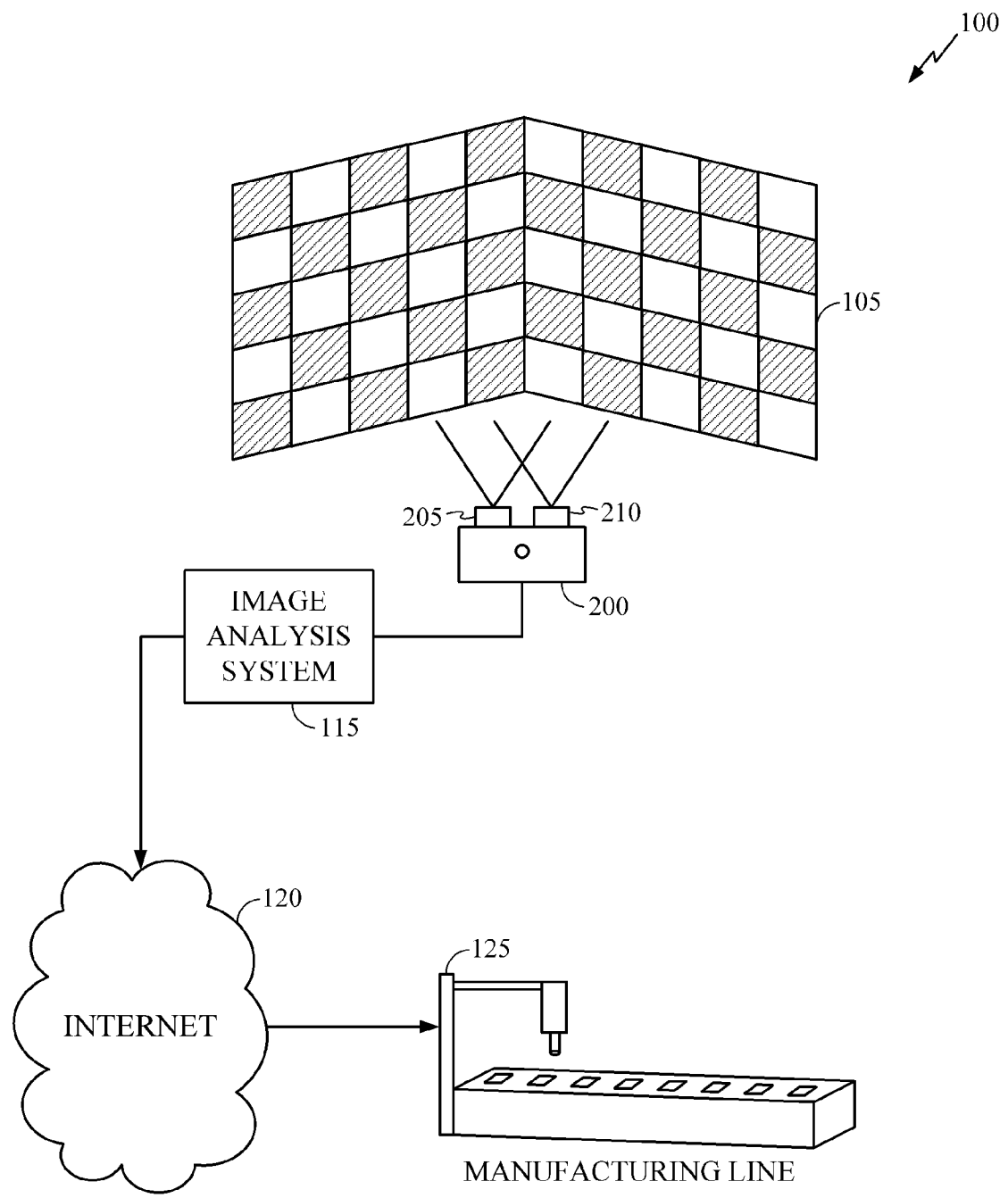
FIG. 1 illustrates a schematic of an imaging sensor yield improvement system and apparatus.

Visual experiments indicate that in order to view 3D stereo images with minimal discomfort, the left and right digital sensors that capture the images should be fully aligned with one another. At most, the image sensors within the pair should be at least fully parallel, i.e. they differ only by horizontal or vertical shifts which are more easily corrected by digital editing of the captured image. For desirable 3D effects and fusibility of images, a horizontal distance between image sensors in a stereoscopic sensor pair is typically around 3.25 cm. In addition, there is preferably only a relatively small horizontal or vertical shift between the sensors in the pair. However, in actual practice, obtaining perfectly aligned parallel image sensors is often unachievable due to mechanical mounting limitations. Factory automation equipment does not currently provide the automation accuracy required to reproducibly mount the two image sensors so that they are perfectly aligned in every digital stereoscopic device. Thus, embodiments of the invention provide systems and methods for providing feedback to manufacturing lines in order to more accurately mount image sensors onto mounting plates to increase the yield and accuracy of stereoscopic imaging devices.

Because of the persistent misalignments caused by the difficulty in precisely manufacturing image sensor pairs, digital processing methods have been introduced to help provide high quality stereoscopic images from digital image pairs that were manufactured with some moderate sensor misalignment.

Calibration of stereoscopic images through digital image processing is typically required to align the camera images after they have been captured by an imaging sensor pair. These methods digitally process the stereoscopic image pairs to produce aligned images. Aligning stereoscopic images may include cropping one or both images to correct for horizontal (x axis) or vertical (y axis) shift between the images of a stereoscopic image pair. The two images of a stereoscopic image pair may also be misaligned about a "z" axis, caused when one imaging sensor is slightly closer to a scene being imaged than the other imaging sensor. Cropping may also be required to correct for misalignment due to rotation of the images about an x, y, or z axis. Finally, cropping may also be required to adjust the convergence point of the two images in the stereoscopic image pair.

In addition to the two dimensional x, y and z offsets discussed above, the relative positions of the image sensors in an image sensor pair can also be described by measuring three axes of angular movement and three axes of shift. For purposes of this disclosure, positions on an x, y, and z axis describe relative shift. Angular rotation can be described by rotations about a horizontal (x) axis, also called "pitch," vertical (y) axis, known as "roll," and (z) axis or "yaw."

Variations in the relative position of multiple sensors across one axis can affect stereoscopic image quality more significantly than variations across another axis. For example, psychophysical tests confirm that shift along the y axis, or a variation in pitch angle, have the greatest effect on perceived image quality. These shifts along the y axis or pitch angle are known in the art as vertical disparity. Vertical disparity may cause nausea or headaches when viewed over a prolonged period, as is the case, for example, when viewing stereoscopic videos or movies.

While vertical disparity has a particular impact on stereoscopic image pair quality, the other forms of misalignment mentioned above will also be noticed by viewers and affect their overall perception of the image quality. To correct for misalignments about these six axes, stereoscopic imaging devices can shift and/or crop the stereoscopic image pairs to adjust the alignment of the two images. To minimize the loss of data from an individual image, both images may be digitally cropped as part of the alignment process.

While correcting misalignments between images may be part of the digital processing performed before displaying a stereoscopic imaging pair to a user, other adjustments to the images may also be needed. For example, stereoscopic image pairs may be adjusted to achieve a particular convergence point. The convergence point of a stereoscopic image pair determines at what depth each object in the stereoscopic image is perceived by a viewer. Objects with zero offset between the two images when the two images are displayed are said to be at zero parallax, and thus are perceived at screen depth. Objects with positive parallax are perceived at greater than screen depth while objects with negative parallax are perceived as in front of the screen.

However, there is ultimately a limited amount of image data that can be removed from each image of a stereoscopic image pair without adversely affecting image quality. This limited amount of image data is known as a total crop "budget." The total crop budget corresponds to the amount of image data available within an image that can be removed during the cropping operations necessary to align images (a "crop budget") and set an appropriate convergence point (a "convergence budget"). In some embodiments, a maximum cutoff of 10% of the available lines of pixels may be allocated as the maximum correction parameter, since higher cutoff values may significantly degrade 3D image quality. In practice, this 10% may be taken as 5% cropped from the top and bottom or 5% cropped from either of the sides.

If sensor correction is greater than a specified maximum correction parameter, the sensor may need to be discarded. These imperfections in sensor production may cause a significant yield drop.

These multiple crop operations may also adversely affect the viewable region of the stereoscopic image. The resulting size of the viewable region of the resulting stereoscopic image pair may limit a device's ability to compensate for misaligned stereoscopic image pairs in some imaging environments. For example, calibration processes that remove more than 10% of an image through cropping may result in an unsatisfactory image. In some cases, stereoscopic sensor pairs may be manufactured so far out of alignment such that correction of the images requires cropping more than a specified maximum percentage of pixels of an image, resulting in undesirable images. In such cases, the manufactured imaging sensors may have to be discarded, reducing the sensor yield of a manufacturing or production line.

Therefore, embodiments of the invention relate to systems and methods that provide feedback to a manufacturing line that is mounting imaging sensors onto a mounting plate, or directly into an image capture device. This feedback allows the physical imaging sensor placement within the capture device to be corrected to improve yields and sensor pair alignment. By using feedback from the described image sensor alignment system, a manufacturing line may improve sensor yields by adjusting the pick and place machinery to more accurately position the image sensors.

Embodiments described herein include methods, systems, and apparatus to estimate a variety of parameters relating to the placement of image sensor pairs on a mounting plate. For example, embodiments may measure the x, y, and z positions of dozens or hundreds of image sensors mounted onto mounting plates. Embodiments may also measure the roll, pitch and yaw of the image sensor pairs as they are mounted into a device. By providing an analysis of the image sensor alignment errors in a batch of devices taken from the manufacturing line, embodiments of the system can determine a set of correction parameters. These correction parameters can be fed into the pick and place machinery at the manufacturing line to improve sensor yield so that the image sensors are manufactured more closely within manufacturing tolerances.

Some embodiments of the invention include taking a plurality of mounted stereoscopic image sensor pairs from a manufacturing line, capturing one or more images of a predefined correction pattern with each sensor pair, and measuring sensor correction angles. These correction angles are the angles describing the difference between the measured actual orientation of each sensor with respect to the other sensor in comparison to an ideal orientation. These correction angles can then be plotted in a three dimensional space to determine the mean or median of the universe of measured sensor correction angles. By analyzing the plotted three dimensional space occupied by the sensor correction angles, one can compare the sensor correction angles to a maximum correction parameter that if introduced to the manufacturing line would improve sensor pair yields.

FIG. 1 depicts a schematic illustration of one embodiment of a sensor yield improvement system 100 configured to measure the mounting position of stereoscopic image sensors. As shown, an image capture device 200 has two side-by-side imaging sensors 205 and 210. The image capture device may be a complete device, such as a cellular telephone or digital camera, or just a mounting board where the sensors have been mounted through a manufacturing process. The imaging sensors 205 and 210 are shown as mounted adjacent one another on the image capture device 200 such that they can capture a stereoscopic image of a correction pattern 105. The correction pattern includes a series of checkered blocks which, as discussed below with respect to FIG. 3, will allow an image analysis system 115 to determine the relative positions of the image sensors 205 and 210 as they are mounted onto the image capture device 200.

The image analysis system 115 may be wire or wirelessly connected through a wide area network 120, such as the Internet, to a manufacturing line 125. This connection to the manufacturing line allows the image analysis system 115 to analyze the images coming from the device 200, and thereafter transmit production correction parameters to the manufacturing line 125 such that future sensor production on the manufacturing line incorporates the production correction parameters.

Figure 2A:
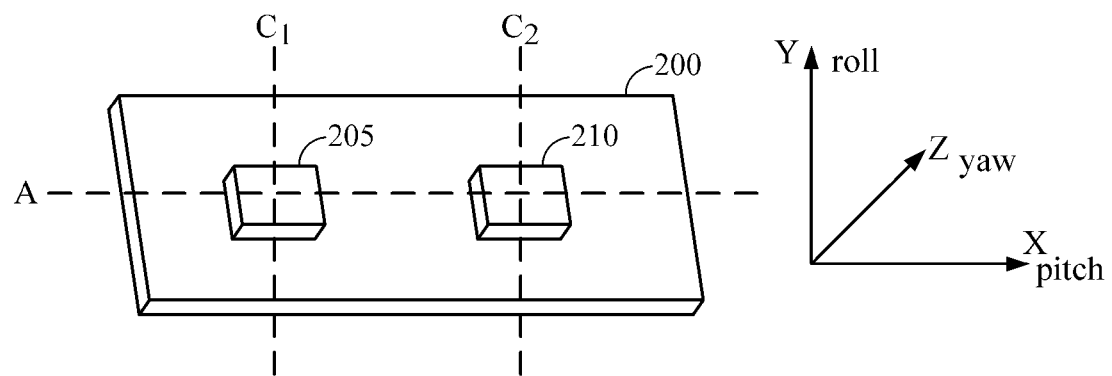
FIG. 2A illustrates a mounted imaging sensor pair.

FIG. 2A illustrates one embodiment of a mounted imaging sensor pair. Imaging sensors 205 and 210 are mounted on a plate or image capture device 200. Preferably, the imaging sensors 205 and 210 lie in the same plane such that pixel rows running through the middle of the two sensors lie in one line, indicated by the line A in FIG. 2A. Additionally, the sensors 205 and 210 are preferably aligned such that the lines C1 and C2 indicating a row of pixels running vertically through each sensor are parallel. The distance between the centers of the imaging sensors 205 and 210 is preferably 3.25 cm with a deviation desirably no more than plus or minus ten percent. In cases of deviations from the preferable position, the sensors 205 and 210 are digitally calibrated through digital processing. In some instances, digital calibration cannot correct for the physical deviations of the sensors 205, 210.

Figure 2B:
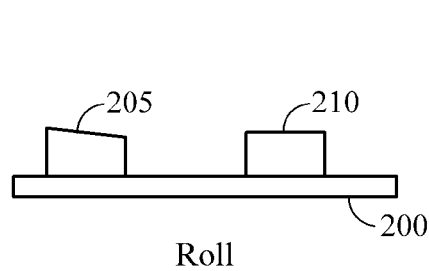
FIG. 2B illustrates a mounted imaging sensor pair in which one sensor is rotated in the roll direction.
Figure 2C:
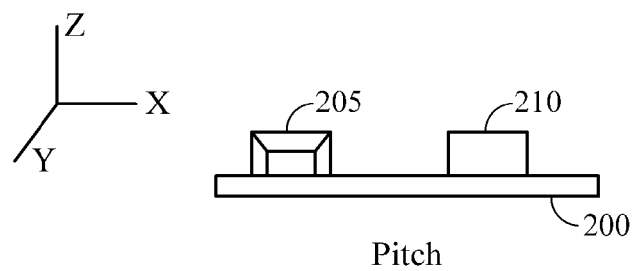
FIG. 2C illustrates a mounted imaging sensor pair in which one sensor is rotated in the pitch direction.
Figure 2D:
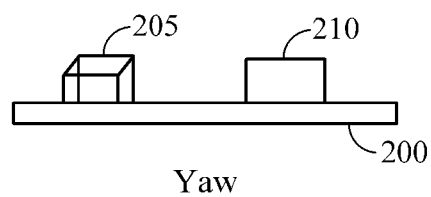
FIG. 2D illustrates a mounted imaging sensor pair in which one sensor is rotated in the yaw direction.

FIGS. 2B, 2C, and 2D illustrate three possible angular deviations of sensors 205 and 210. In FIGS. 2B-2D, sensor 205 is shown in each possible angular deviation. FIG. 2B depicts sensor 205 with an angular deviation about the y axis, known as roll. FIG. 2C depicts sensor 205 with an angular deviation about the x axis, known as pitch. FIG. 2D depicts sensor 205 with an angular deviation about the z axis, known as yaw. In each figure, only one angular rotation is depicted. However, sensors 205 and 210 may be rotated around multiple axes. Additionally, FIGS. 2B-2D do not depict sensor 210 as having any angular rotation. One or both of sensors 205 and 210 may have one or multiple angular rotation deviations from a parallel orientation.

Figure 3:
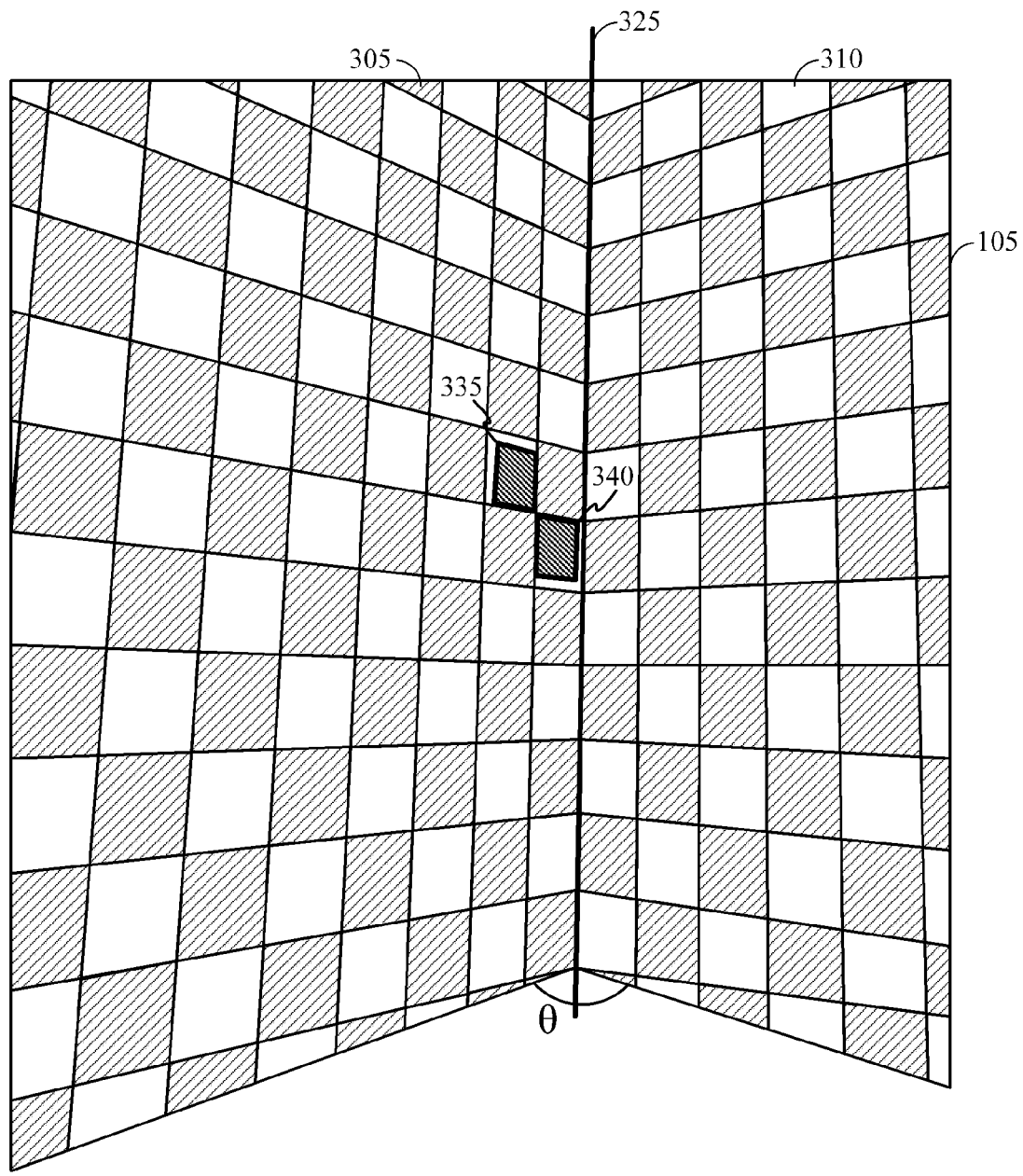
FIG. 3 illustrates one embodiment of a correction pattern.

One embodiment of a correction pattern 105 is shown in FIG. 3. The correction pattern 105 may be composed of two planes 305 and 310 of alternating light and dark squares, forming a checkered pattern. The size of the light and dark squares is desirably 50 mm. The planes 305 and 310 desirably meet at a ninety degree angle, θ, about the intersection 325. Correction pattern 105 may also comprise a set of colorations 335 and 340 that are different from the light and dark squares. These colorations 335 and 340 provide a point of origin for the correction angle calculation discussed below. The colorations may be placed at the right-middle area of the left plane. The imaging sensors 205 and 210 are desirably placed at the same height as the colorations and 60 cm from the left and right planes of the correction pattern 105. Desirably, the imaging sensor pairs 205 and 210 should see only the light and dark squares of the correction pattern 105.

Figure 4:
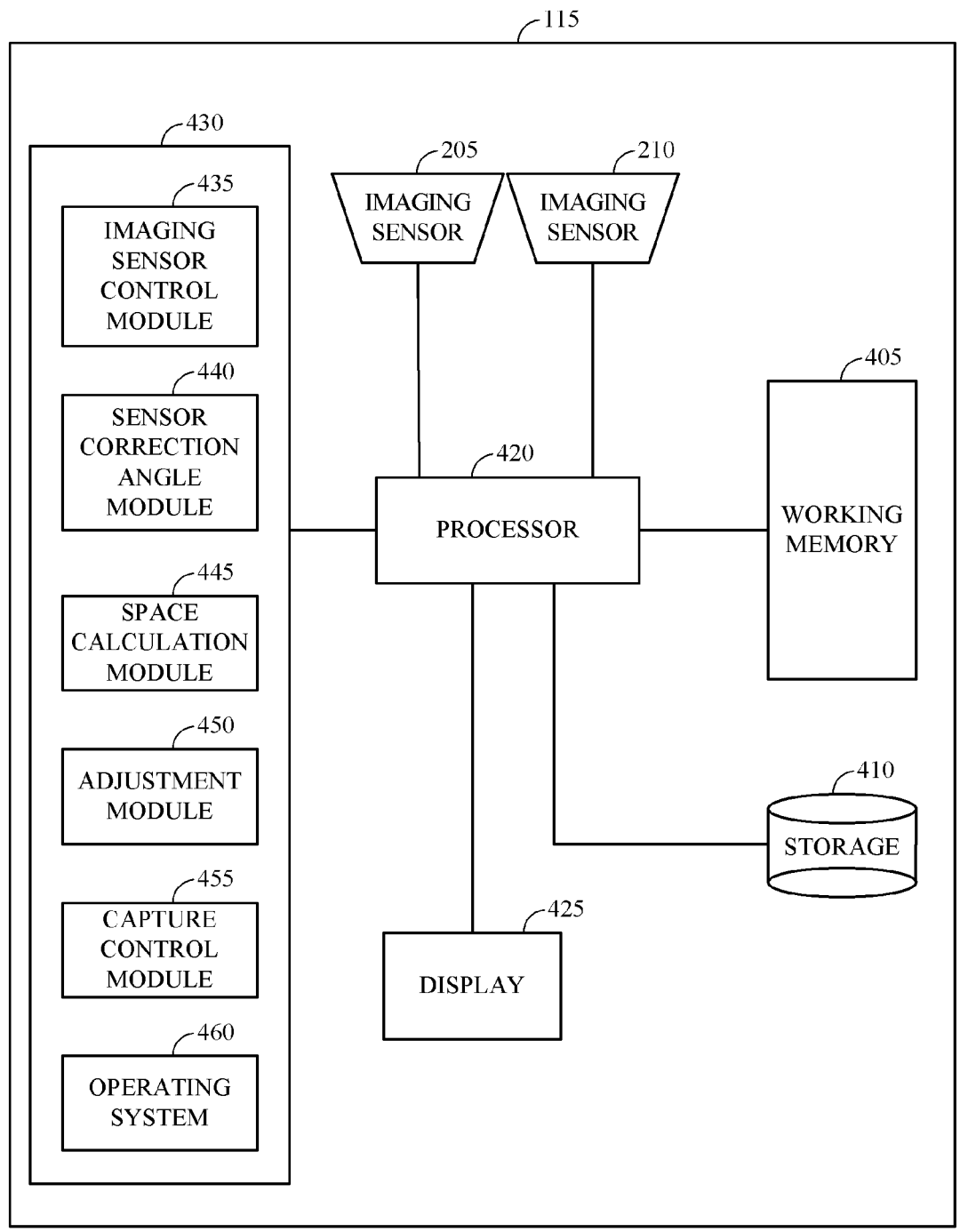
FIG. 4 is a block diagram depicting a system implementing some operative embodiments.

FIG. 4 depicts a high-level block diagram of one embodiment of an image analysis system 115 having a set of components including a processor 420 linked to imaging sensors 205 and 210. A working memory 405, storage 410, electronic display 425, and memory 430 are also in communication with processor 420.

Image analysis system 115 may be a stationary device such as a desktop personal computer or it may be a mobile device. A plurality of applications may be available to the user on image analysis system 115. These applications may include traditional photographic applications, high dynamic range imaging, panoramic video, or stereoscopic imaging such as 3D images or 3D video.

Processor 420 may be a general purpose processing unit or a processor specially designed for imaging applications. As shown, the processor 420 is connected to a memory 430 and a working memory 405. In the illustrated embodiment, the memory 430 stores an imaging sensor control module 435, a sensor correction angle module 440, a space calculation module 445, an adjustment module 450, a capture control module 455, operating system 460, and user interface module 465. These modules may include instructions that configure the processor 420 to perform various image processing and device management tasks. Working memory 405 may be used by processor 420 to store a working set of processor instructions contained in the modules of memory 430. Alternatively, working memory 405 may also be used by processor 420 to store dynamic data created during the operation of image analysis system 115.

As mentioned above, the processor 420 is configured by several modules stored in the memory 430. Imaging sensor control module 435 includes instructions that configure the processor 420 to adjust the focus position of imaging sensors 205 and 210. The imaging sensor control module 435 also includes instructions that configure the processor 420 to capture images of a correction pattern with imaging sensors 205 and 210. Therefore, processor 420, along with image capture control module 455, imaging sensors 205 or 210, and working memory 405, represent one means for providing a first image and a second image that are part of a stereoscopic image pair. The sensor correction angle module 440 provides instructions that configure the processor 420 to determine correction angles of the imaging sensor pair 205 and 210 based on one or more images of a correction pattern. Therefore, processor 420, along with sensor correction angle module 440 and working memory 405, represent one means for determining correction angles of the sensor based on one or more images of the correction pattern.

Figure 6:
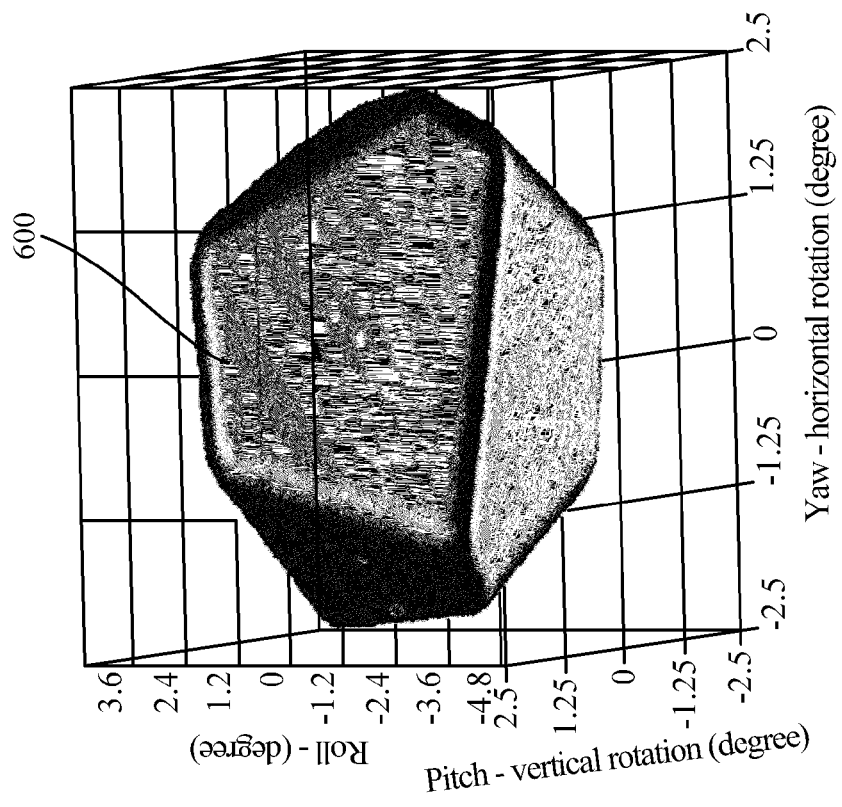
FIG. 6 is a graphical representation of an ideal three dimensional space of correction angles.
Figure 6:
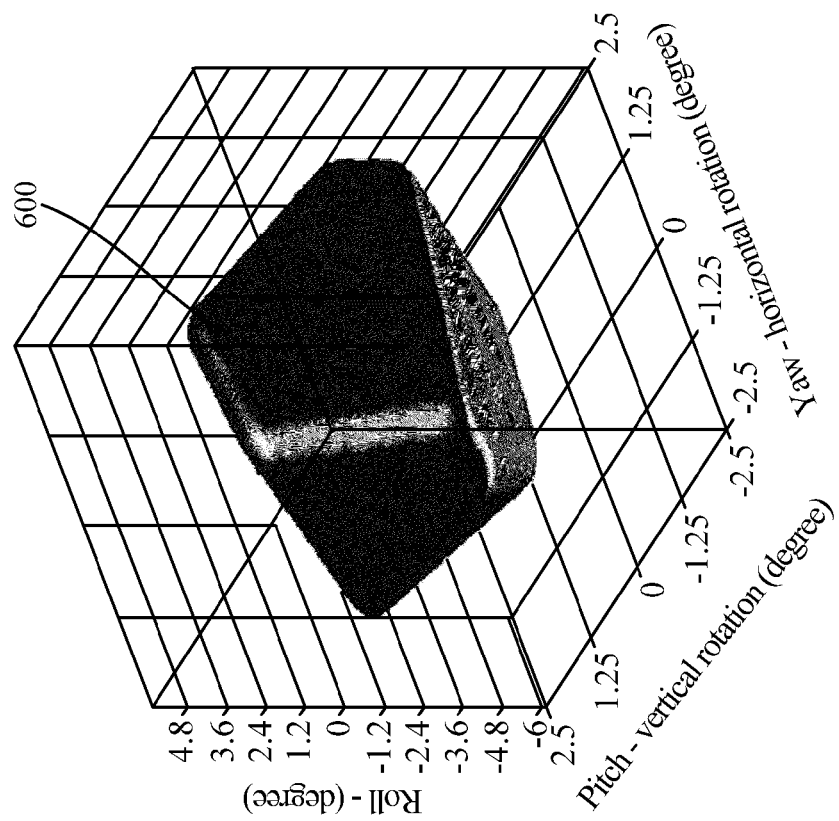
Figure 7:
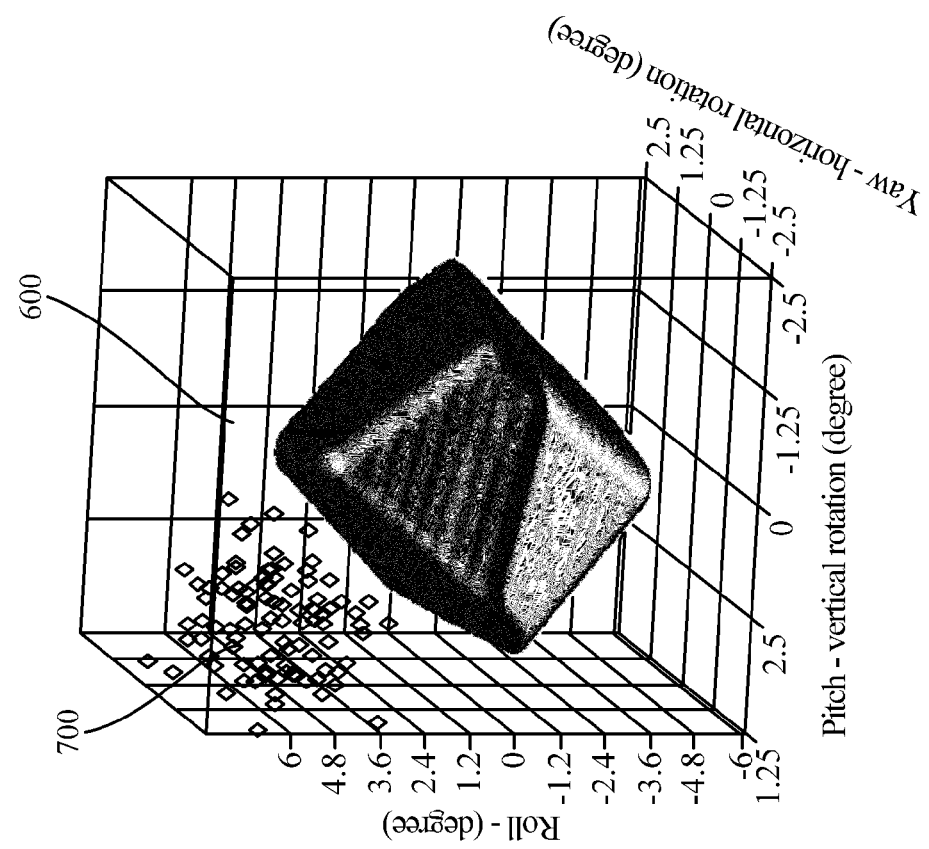
FIG. 7 is a graphical representation of measured correction angles for a sample of imaging sensor pairs and an ideal three dimensional space of correction angles.
Figure 7:
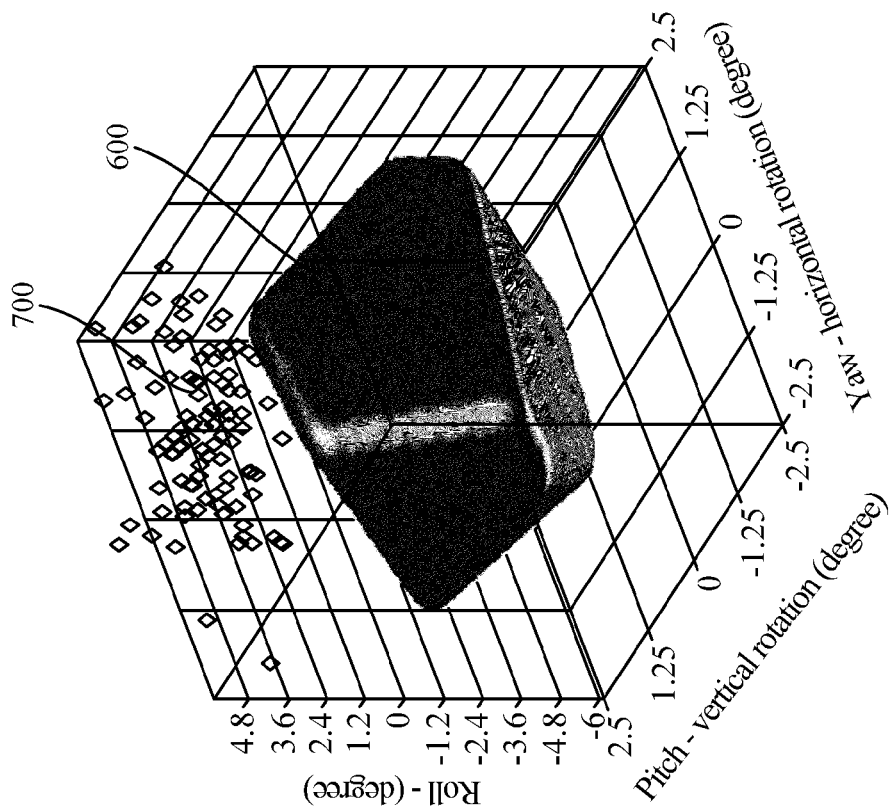

The space calculation module 445 provides instructions that configure the processor 420 to represent the correction angles of the sensor pair in a three dimensional space and define a region 600 in the three dimensional space for which digital correction of images taken by imaging sensor pair 205 and 210 is possible, as shown in FIGS. 6 and 7. Thus, processor 420, along with space calculation module 445 and working memory 405, represent one means for representing the correction angles of the sensor pair in a three dimensional space. The adjustment module 450 provides instructions that configure a processor to statistically process the correction angles of each imaging sensor pair 205 and 210 to determine production correction parameters and input the production correction parameters to a manufacturing line 125. Therefore, processor 420, along with adjustment module 450 and working memory 405, represent one means for analyzing the three dimensional space of correction angles to determine a set of production correction parameters. User interface module 465 includes instructions that configure the processor 420 to display information on an electronic display accessible to the user while running the image analysis system 115.

Operating system module 460 configures the processor 420 to manage the memory and processing resources of system 115. For example, operating system module 460 may include device drivers to manage hardware resources such as the electronic display 435 or imaging sensors 205 and 210. Therefore, in some embodiments, instructions contained in the image processing modules discussed above may not interact with these hardware resources directly, but instead interact through standard subroutines or APIs located in operating system component 460. Instructions within operating system 460 may then interact directly with these hardware components.

Processor 420 may write data to storage module 410. While storage module 410 is represented graphically as a traditional disk drive, those with skill in the art would understand multiple embodiments could include either a disk-based storage device or one of several other types of storage mediums, including a memory disk, USB drive, flash drive, remotely connected storage medium, virtual disk driver, or the like.

Although FIG. 4 depicts a device comprising separate components to include a processor, two imaging sensors, electronic display, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 4 illustrates two memory components, including memory component 430 comprising several modules and a separate memory 405 comprising a working memory, one with skill in the art would recognize several embodiments utilizing different memory architectures. For example, a design may utilize ROM or static RAM memory for the storage of processor instructions implementing the modules contained in memory 430. Alternatively, processor instructions may be read at system startup from a disk storage device that is integrated into image analysis system 115 or connected via an external device port. The processor instructions may then be loaded into RAM to facilitate execution by the processor. For example, working memory 405 may be a RAM memory, with instructions loaded into working memory 405 before execution by the processor 420.

Figure 5:
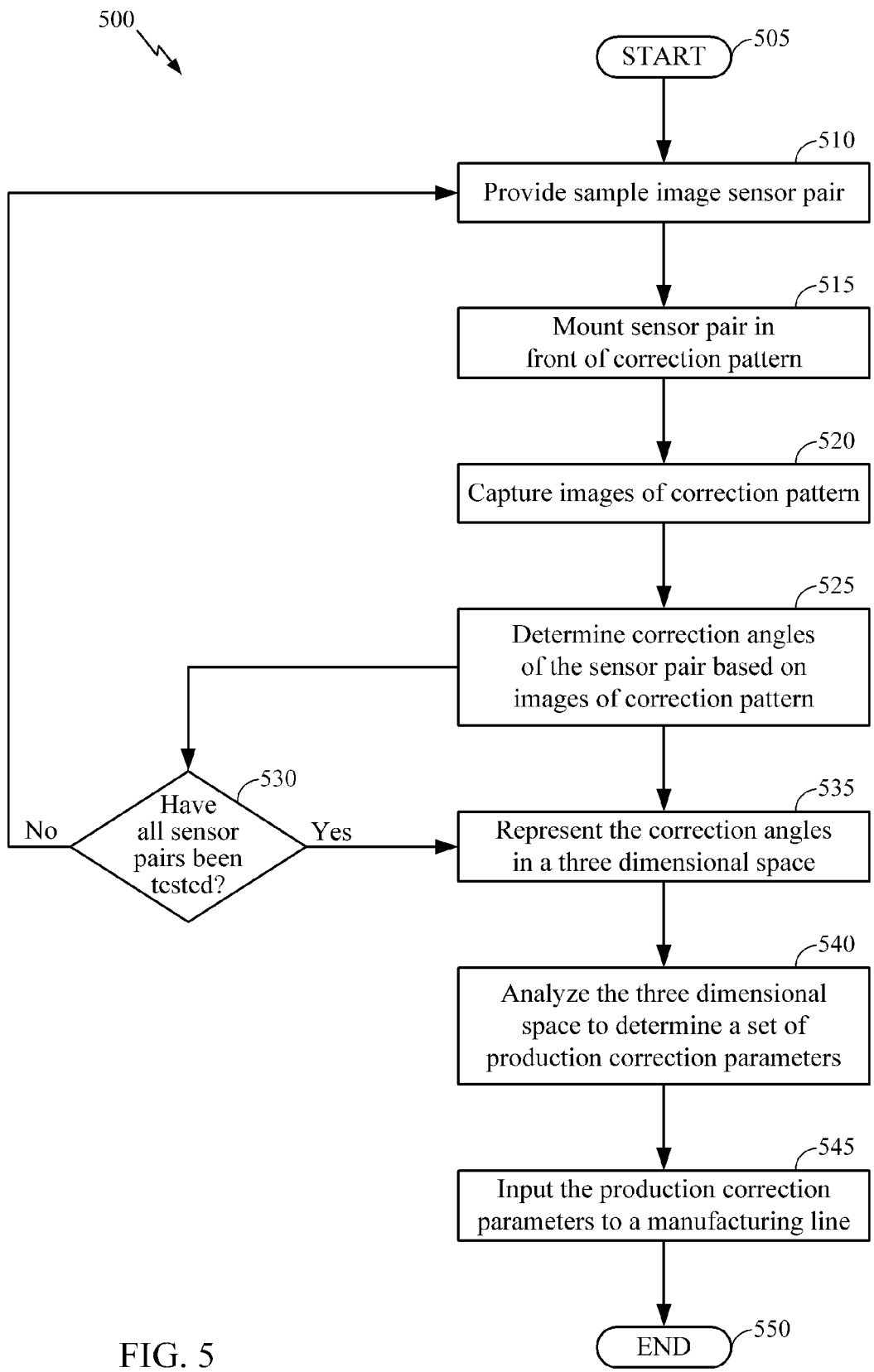
FIG. 5 is a flow chart depicting a high-level overview of a process to improve sensor yield.

FIG. 5 is a flow chart depicting a high-level overview of a sensor yield improvement process that may be implemented in several modules depicted in FIG. 4. Process 500 may be used in some embodiments to determine correction angles for a stereoscopic image pair, represent the correction angles in a three dimensional space, statistically process the correction angles to determine a set of production correction parameters, and input the production correction parameters to a manufacturing line to improve sensor pair yields. The process 500 begins at start block 505 and then transitions to block 510 where a pair of imaging sensors is provided. The process 500 then transitions to block 515 where the pair of imaging sensors is mounted in front of a correction pattern. Process 500 then transitions to block 520 where instructions direct the imaging sensor pairs to capture images of the correction pattern 105. Imaging sensor control module 435 may then configure the processor 420 to control imaging sensors 205 and 210, possibly via operating system module 460, to capture images of the correction pattern. The process 500 then transitions to block 525 where instructions determine correction angles of the sensor pair 205 and 210 based on the images taken by the sensor pair 205 and 210 of the correction pattern 105. Sensor correction angle module 440 may then configure the processor to perform coordinate origin location and real world coordinate location determinations for each image taken by the imaging sensor pair 205 and 210 to determine the correction angles of the sensor pair 205 and 210. Correction angles for each sensor pair include correction angles in each of the roll, pitch, and yaw directions, as defined above. After the correction angles have been determined, process 500 transitions to decision block 530 where a decision is made as to whether additional imaging sensors pairs should be tested. If there are more imaging sensor pairs to be tested, process 500 returns to block 510 and repeats the process as described above.

If all of the desired sensor pairs have been tested, process 500 transitions to block 535 where instructions represent the correction angles of the sensor pairs in a three dimensional space. The three dimensional space is identified by the axes x, y, and z, as defined above. The correction angles corresponding to rotation about each of these axes is plotted within the three dimensional space for each tested sensor pair, as shown in FIG. 7 and discussed in further detail below. Additionally, an ideal space of correction angles 600 for which digital correction of an image taken by a sensor pair is possible is plotted in the same three dimensional space as the correction angles, as shown in FIGS. 6 and 7 and discussed in further detail below. The set of points 700 corresponding to the correction angles for each sensor pair is compared to the ideal space 600 defined by the set of set of correction angles for which digital correction of an image is possible.

Digital correction of an image may involve "vertically cropping" outside dimensions of each image in the stereoscopic image pair. An outside dimension of a first image of a stereoscopic image is a dimension that bounds image data that does not overlap with image data of a second image of the stereoscopic image pair. In other words, an outside dimension of an image may form a border of a stereoscopic image pair when the stereoscopic image is viewed by a viewer. An inside dimension of a first image of a stereoscopic image is a dimension that bounds image data that may overlap with image data of a second image of the stereoscopic image pair. An inside dimension of an image is opposite an outside dimension of the image. Since a vertical crop operation typically removes all pixels within a particular "column" of an image, a budget of ten percent (10%) of horizontal resolution may allow the loss of 10% of the total image area for image adjustment. Sensor correction angles that indicate a loss of greater than 10% of horizontal resolution indicate that the sensor pairs have been manufactured with a deviation that is greater than can be adjusted with digital processing. Therefore, these sensor pairs will need to be discarded.

Statistical analysis of the set of sensor pair correction angles, performed by the adjustment module 450 determines a set of production correction parameters, as illustrated in block 540. Production correction parameters consist of a set of possible adjustments that may be made to a manufacturing line in order to manufacture image sensor pairs that may be digitally calibrated without a loss of more than 10% of horizontal resolution of the stereoscopic image taken by those sensors. Process 500 then transitions to block 545 where instructions input the production correction parameters to a manufacturing line to improve sensor yields. Process 500 then transitions to block 550 and the process ends.

Figure 8:
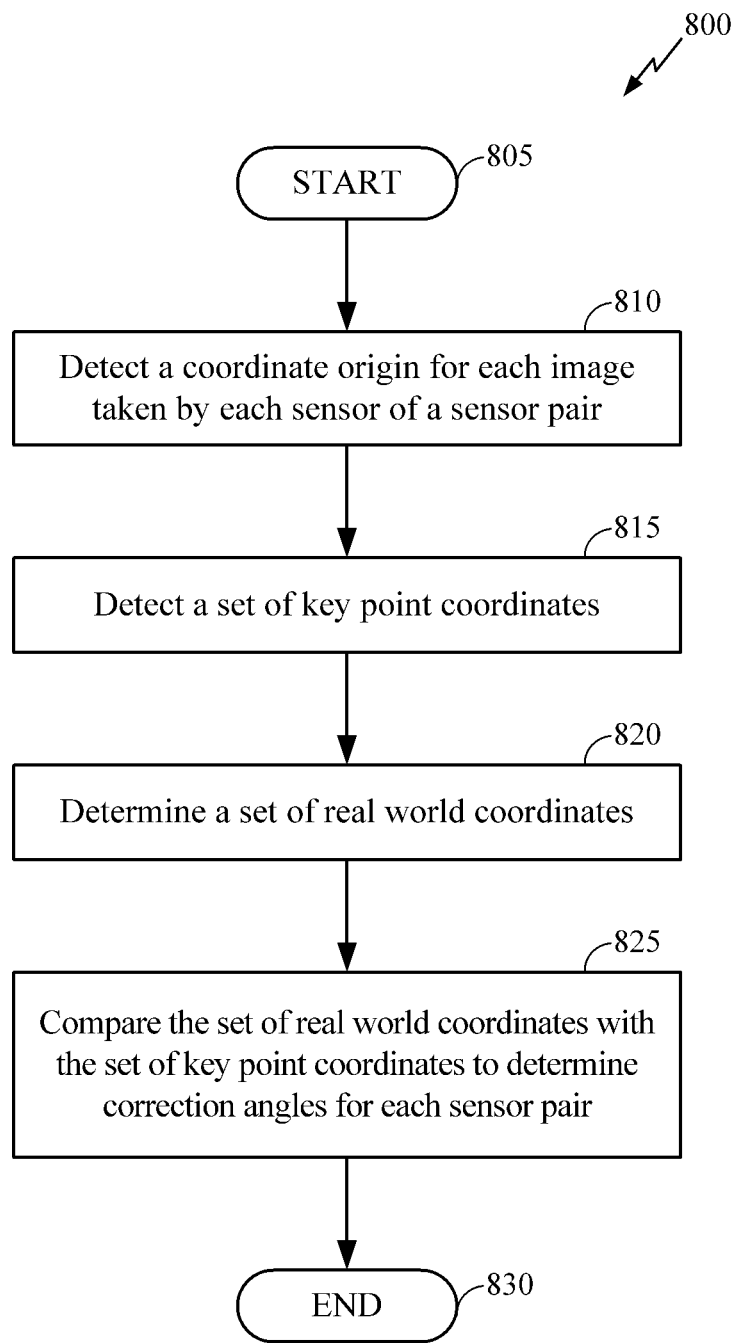
FIG. 8 is a flow chart depicting a process utilized in one embodiment of a sensor correction angle measurement module.
Figure 10:
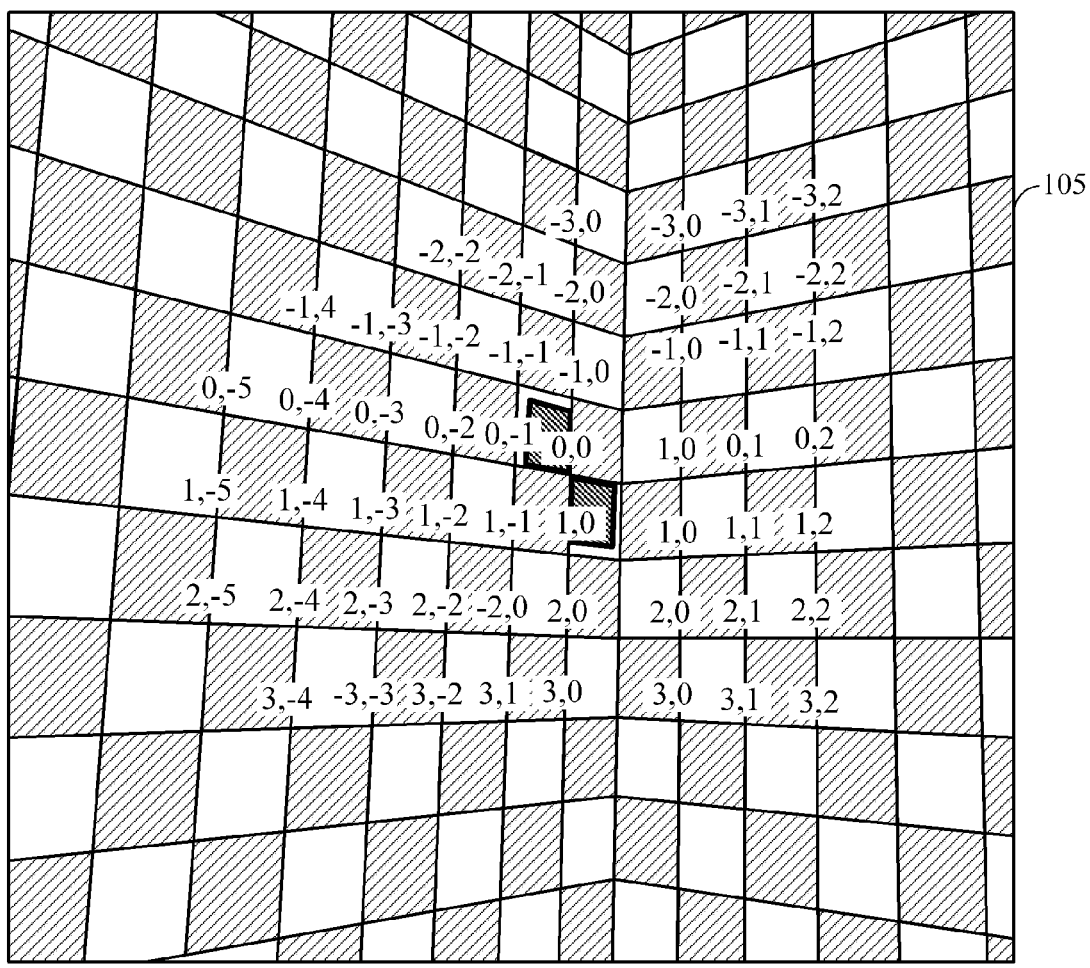
FIG. 10 illustrates one embodiment of the labeled key points for the correction pattern shown in FIG. 3.

FIG. 8 is a flow chart illustrating a process 800 that runs within one embodiment of a sensor correction angle module 440 of FIG. 4. The process 800 begins at start block 805 and then transitions to block 810 where instructions direct processor 420 to detect a coordinate origin for each image taken by each sensor of a sensor pair 205 and 210. As discussed above, FIG. 3 depicts a correction pattern 105 used in one embodiment of a sensor yield improvement process. Squares of a different coloration may be placed on the correction pattern in order to determine a coordinate origin for each image. After determining the coordinate origin for each image, process 800 then transitions to block 815 where instructions direct processor 420 to detect a set of key point coordinates for each image. FIG. 10 depicts a correction pattern 105 labeled with key points within a boundary around the coordinate origin. From block 815, process 800 transitions to block 820 where instructions direct processor 420 to determine a set of real world coordinates by computing key point real world positions and matching the key point image coordinates with real world coordinates to estimate a 3×4 projection matrix used for calibrating the images.

The relation between the real world 3D coordinates of points on the correction pattern and their corresponding pixel locations on the 2D images is determined using real world to image frame mapping. Assuming an optical axis runs through the center of both images taken by the imaging sensor pair 205 and 210 and an image with square pixels, mapping from real world coordinates (X, Y, Z) to pixel coordinates (Px, Py) is given by:

$$\begin{bmatrix} P_x W \\ P_y W \\ W \end{bmatrix} = M \begin{bmatrix} X \\ Y \\ Z \\ 1 \end{bmatrix}$$

Where M is a 3×4 matrix.

If Tx, Ty, and Tz are the sensor coordinates, then, by expanding the above expression:

$$Px = \frac{m_{11}X + m_{12}Y + m_{13}Z + m_{14}}{m_{31}X + m_{32}Y + m_{33}Z + m_{34}}$$

$$Py = \frac{m_{21}X + m_{22}Y + m_{23}Z + m_{24}}{m_{31}X + m_{32}Y + m_{33}Z + m_{34}}$$

The calibration matrix M is a combination of 3D rotation matrix R and translation vector T where $f_e$ is the focal distance in pixels.

$$M = \begin{bmatrix} -f_e r_{11} & -f_e r_{12} & -f_e r_{13} & -f_e T_x \\ -f_e r_{21} & -f_e r_{22} & -f_e r_{23} & -f_e T_y \\ r_{31} & r_{32} & r_{33} & T_z \end{bmatrix}$$

$$R = \begin{bmatrix} r_{11} & r_{12} & r_{13} \\ r_{21} & r_{22} & r_{23} \\ r_{31} & r_{32} & r_{33} \end{bmatrix}$$

$$T = \begin{bmatrix} T_x \\ T_y \\ T_z \end{bmatrix}$$

M can be solved by solving a linear system:

$$Am = 0$$

$$A = \begin{bmatrix} X_1 & Y_1 & Z_1 & 1 & 0 & 0 & 0 & 0 & -P_{x1}X_1 & -P_{x1}Y_1 & -P_{x1}Z_1 & -P_{x1} \\ 0 & 0 & 0 & 0 & X_1 & Y_1 & Z_1 & 1 & -P_{y1}X_1 & -P_{y1}Y_1 & -P_{y1}Y_1 & -P_{y1} \\ \ldots & \ldots & \ldots & \ldots & \ldots & \ldots & & & & & & \end{bmatrix}$$

$$m = [m_{11}\ m_{12}\ m_{13}\ m_{14}\ m_{21}\ m_{22}\ m_{23}\ m_{24}\ m_{31}\ m_{32}\ m_{33}\ m_{34}]^T$$

The twelve element vector m can be computed through singular value decomposition, that is accurate within a scaler. The structure of the vector can be used to compute the scaler. It is possible to obtain image sensor intrinsic parameters from the matrix but it is not necessary as they are known a priori. R and T can be estimated for both image sensors separately. Obtaining M1 and M1, defined below, fully defines the rotations and position shifts of the sensors. Note that single image transform cannot compensate for deviation in T and can only compensate for rotations.

$$M1 = [R1|T1]\ M2 = [R2|T2]$$

Sensor coordinates relative to one of the sensor planes (Ts1, Ts2) can be computed from T1 and T2. Assuming Ts1 and Ts2 are within tolerances a transform can be obtained to compensate for the relative rotation between the two sensors as:

$$R = R_{left} \times R_{right}^{-1}$$

If Ts1 and Ts2 are not within the acceptable tolerances, the 3×3 R matrix along with the 3×3 D matrix is used to warp the image. The D matrix is used to re-normalize the pixel values after they are multiplied by R.

$$D = \begin{bmatrix} d & d & d^2 \\ d & d & d^2 \\ 1 & 1 & d^2 \end{bmatrix}$$

Where $d = \dfrac{W}{2 * \tan\left(\dfrac{HFOV}{2}\right)}$ and HFOV=Horizontal Field of View and W is the image width in pixels.

A pixel located of (xi, yi, 1)' becomes D*R*(xi,yi,1)' after warping the image.

From block 820, process 800 transitions to block 825, where instructions direct the processor 420 to compare the set of real world coordinates with the set of key point coordinates to determine correction angles for each sensor pair. Once all of the correction angles have been determined for the sensor pair, process 800 moves to block 830 and ends.

Figure 9:
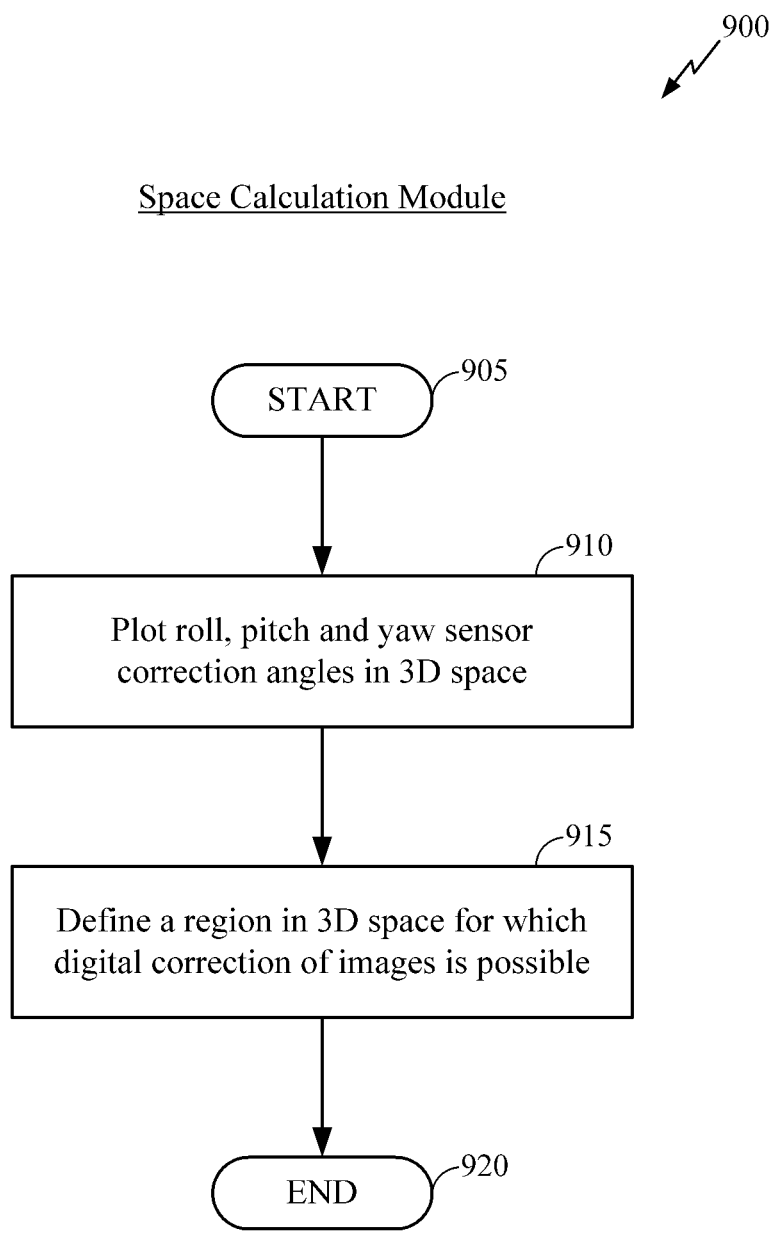
FIG. 9 is a flow chart depicting a process utilized in one embodiment of a space calculation module.

FIG. 9 depicts a flow chart illustrating a process 900 that runs within one embodiment of space calculation module 445 of FIG. 4. Process 900 may be used in some embodiments to plot the correction angles for roll, pitch, and yaw of a sensor pair relative to a defined region in 3D space of a set of correction angles for which digital correction is possible. The process 900 begins at start block 905 and then transitions to block 910 where instructions direct processor 420 to plot the roll, pitch, and yaw correction angles, determined by the sensor correction angle module 440, discussed above, for a sensor pair in a 3D space. The process 900 then continues to block 915 where instructions direct processor 420 to plot a defined region in 3D space for which digital correction of the images captured by the sensor pair is possible without resulting in more than a set cutoff amount of horizontal resolutions. In one embodiment, the cutoff amount is ten percent. Once the sensor pair correction angles and the defined region have been plotted in 3D space, process 900 move to block 920 and process 900 ends. Process 900 may be repeated for each imaging sensor pair which is tested according to the process 500 shown in FIG. 5.

Figure 11:
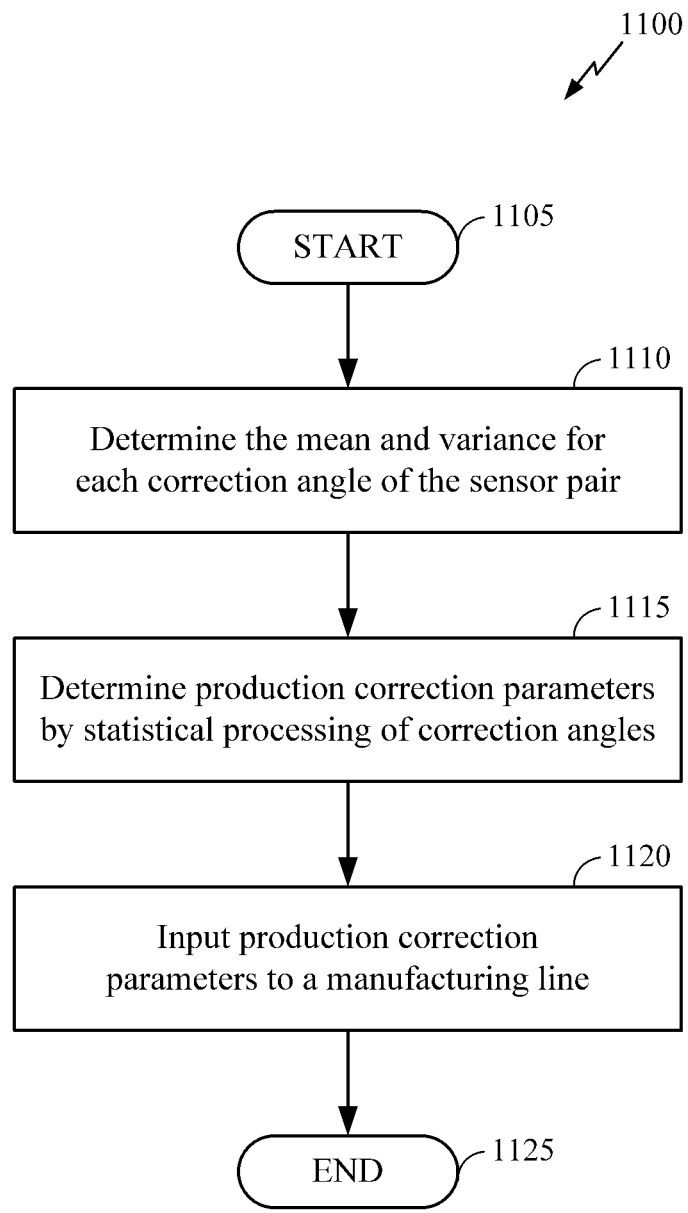
FIG. 11 is a flow chart depicting a process utilized in one embodiment of an adjustment module.

Once the three dimensional space has been populated with a graphical representation 700 of the imaging sensor pair correction angles illustrating the required overall rotational correction of each sensor pair and the defined region 600 of digitally correctable rotational corrections, a set of production correction parameters can be determined. FIG. 11 is a flow chart illustrating a process 1100 that runs within one embodiment of an adjustment module 450 of FIG. 4. Process 1100 may be used in some embodiments to statistically analyze the scatter plot of imaging sensor pair correction angles to determine production correction parameters for input into a manufacturing line. The process 1100 begins at start block 1105 and transitions to block 1110 where instructions direct a processor 420 to determine the mean and variance for each correction angle of the imaging sensor pair. Once this statistical calculation has been performed process 1100 transitions to block 1115 where instructions direct processor 420 to determine production correction parameters through minimization of the variance or the mean. In other embodiments, other statistical processing may be performed, such as acquiring the maximum correction angle value and minimizing the correction angles sequentially, as in a minimax strategy. For example, a minimax strategy may begin by minimizing the angle which deviates the most from the desired range and minimizing this angle as much as possible. The strategy continues by minimizing the next largest deviant angle and so on, until the budget is reached. In other embodiments, correction angles for rotation about two axes, such as roll and pitch, could be calculated while holding fixed a third correction angle, such as yaw. In this embodiment, a possible set of correction angles for roll and pitch may be calculated that results in the overall rotational correction of the sensor pair falling within the defined region in 3D space for which digital correction is possible without exceeding a maximum horizontal resolution cutoff value. Projection matrices, for example (3×3) matrices, may be built with various possible yaw, pitch, and roll correction angles. Only the yaw, pitch, and roll correction angle combinations which result in image correction within the budget are retained in one embodiment.

After statistical processing has been performed to calculate the production correction parameters, process 1100 transitions to block 1120 where instructions direct processor 420 to input the production correction parameters to a manufacturing line, resulting in improved sensor yields. The production correction parameters could be in the form a 3×3 projection matrix. The placement arm of a manufacturing line could move in discrete steps along all three axes and angles, in one embodiment using a stepper motor. The movement of the placement arm could be controlled or adjusted according to the three estimated rotation or correction angles, allowing the production sensors to be manufactured within the acceptable range. Process 1100 then transitions to block 1125 and the process ends.

The present embodiments further contemplate displaying the stereoscopic image pair on a display screen. One skilled in the art will recognize that these embodiments may be implemented in hardware, software, firmware, or any combination thereof.

In the above description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those having skill in the art will further appreciate that the various illustrative logical blocks, modules, circuits, and process blocks described in connection with the implementations disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such that the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method to improve imaging sensor yields for a pair of image sensors configured to capture a stereoscopic image, comprising:
   providing a stereoscopic image sensor pair taken from a manufacturing line;
   capturing one or more images of a correction pattern with the sensor pair;
   determining correction angles of the sensor pair based on the one or more images of the correction pattern;
   representing the correction angles of the sensor pair in a three dimensional space;
   analyzing the three dimensional space of correction angles by determining a mean and variance of the correction angles to determine a set of production correction parameters that satisfies one or both of a minimized variance of the correction angles or a zero-valued mean of the correction angles; and
   inputting the production correction parameters to the manufacturing line to improve sensor pair yields.

2. The method of claim 1, wherein determining correction angles of the sensor pair comprises measuring a roll correction angle, measuring a yaw correction angle, and measuring a pitch correction angle of the image sensors in the sensor pair.

3. The method of claim 1, wherein the correction pattern is a checkerboard composed of alternating light and dark squares.

4. The method of claim 1, wherein the correction pattern further comprises colorations in addition to alternating light and dark squares such that the colorations provide an orientation point for the image sensors in the sensor pair.

5. The method of claim 1, wherein capturing one or more images of a correction pattern comprises capturing a first image of a correction pattern with a first imaging sensor and capturing a second image of a correction pattern with a second imaging sensor.

6. The method of claim 5, wherein determining correction angles of the sensor pair further comprises the steps of detecting a coordinate system origin for each of the first and second images; detecting a set of key point coordinates within a boundary around the origin for each of the first and second images; determining a set of real world coordinates from the set of key point coordinates for each of the first and second images; and comparing the set of real world coordinates with the set of key point coordinates to determine correction angles for each sensor pair.

7. The method of claim 1, wherein representing the correction angles of the sensor pair in a three dimensional space comprises graphing a sensor pair correction requirement in a three dimensional space in which a first axis corresponds to a roll correction, a second axis corresponds to a yaw correction, and a third axis corresponds to a pitch correction.

8. The method of claim 2, wherein analyzing the three dimensional space of correction angles further comprises determining the mean and variance for the roll correction angle, the pitch correction angle, and the yaw correction angle.

9. The method of claim 2, wherein analyzing the three dimensional space of correction angles further comprises determining a set of possible combinations of two of the roll, pitch or yaw correction angles while holding fixed a mean of a third correction angle and determining the set of production correction parameters from the set of possible combinations.

10. The method of claim 2, wherein analyzing the three dimensional space of correction angles further comprises determining a maximum correction angle for each of roll, pitch and yaw and minimizing each correction angle sequentially.

11. The method of claim 7, further comprising building a projection matrix of the production correction parameters of the roll, pitch, and yaw correction angles and retaining only those correction angles which result in correction of the images captured by the sensor pair within a specified budget.

12. A system to improve imaging sensor yields for a pair of image sensors configured to capture a stereoscopic image, comprising:
   a correction pattern comprised of two sheets of alternating light and dark squares joined at a ninety degree angle;
   a support for holding a stereoscopic image sensor pair in front of the correction pattern;
   a control module configured to:
   capture one or more images of the correction pattern with a sensor pair;
   determine correction angles of the sensor pair based on the one or more images of the correction pattern;
   represent the correction angles of the sensor pair in a three dimensional space;
   analyze the three dimensional space of correction angles by determining a mean and variance of the correction angles to determine a set of production correction parameters that satisfies one or both of a minimized variance of the correction angles or a zero-valued mean of the correction angles; and
   input the production correction parameters to a manufacturing line to improve sensor pair yields.

13. The system of claim 12, wherein the control module is configured to determine correction angles of the sensor pair by measuring a roll correction angle, measuring a yaw correction angle, and measuring a pitch correction angle of the image sensors in the sensor pair.

14. The system of claim 12, wherein the correction pattern is a checkerboard composed of alternating light and dark squares.

15. The method of claim 14, wherein the correction pattern further comprises colorations in addition to alternating light and dark squares such that the colorations provide an orientation point for the image sensors in the sensor pair.

16. An apparatus for improving imaging sensor yields for a pair of image sensors configured to capture a stereoscopic image, comprising:
   a support for holding a stereoscopic image sensor pair in front of a correction pattern;
   a control module configured to:
   measure correction angles of the image pair;
   represent the correction angles in a three dimensional space;
   analyze the three dimensional space of correction angles by determining a mean and variance of the correction angles to determine a set of production correction parameters that satisfies one or both of a minimized variance of the correction angles or a zero-valued mean of the correction angles;
   compare the correction angles to a specified maximum correction parameter; and
   input the production correction parameters to a manufacturing line to improve sensor pair yields.

17. An apparatus improving imaging sensor yields for a pair of image sensors configured to capture a stereoscopic image, comprising:
- means for providing a first image and a second image of a stereoscopic image pair;
- means for capturing one or more images of a correction pattern with the sensor pair;
- means for determining correction angles of the sensor pair based on the one or more images of the correction pattern;
- means for representing the correction angles of the sensor pair in a three dimensional space;
- means for analyzing the three dimensional space of correction angles by determining a mean and variance of the correction angles to determine a set of production correction parameters that satisfies one or both of a minimized variance of the correction angles or a zero-valued mean of the correction angles; and
- means for imputing the production correction parameters to a manufacturing line to improve sensor pair yields.

18. A non-transitory, computer readable medium, comprising instructions that when executed by a processor cause the processor to perform a method of improving imaging sensor yields for a pair of image sensors configured to capture a stereoscopic image, the method comprising:
- providing a stereoscopic image sensor pair taken from a manufacturing line;
- capturing one or more images of a correction pattern with the sensor pair;
- determining roll, pitch and yaw correction angles of the sensor pair based on the one or more images of the correction pattern;
- representing the correction angles of the sensor pair in a three dimensional space with each dimension corresponding to one of roll, pitch, and yaw;
- analyzing the three dimensional space of correction angles by determining a mean and variance for the correction angles to determine a set of production correction parameters that satisfies one or both of a minimized variance of the correction angles or a zero-valued mean of the correction angles; and
- inputting the production correction parameters to the manufacturing line to improve sensor pair yields.

19. The computer readable medium of claim 18, further containing processor executable instructions that when executed perform a method of building a projection matrix of the production correction parameters of the roll, pitch, and yaw correction angles and retaining only those correction angles which result in correction of the images captured by the sensor pair within a specified budget.

20. The computer readable medium of claim 18, wherein the correction pattern is a checkerboard composed of alternating light and dark squares.

* * * * *